Dec. 28, 1948.  A. L. LEE  2,457,569
SHUTTLE CAR
Filed Jan. 19, 1944  4 Sheets-Sheet 1

INVENTOR:
ARTHUR L. LEE
By Chas. M. Nissen,
ATT'Y

Dec. 28, 1948. A. L. LEE 2,457,569
SHUTTLE CAR
Filed Jan. 19, 1944 4 Sheets-Sheet 3

INVENTOR:
ARTHUR L. LEE,
By Chas. M. Nissen,
ATTY.

Dec. 28, 1948.    A. L. LEE    2,457,569
SHUTTLE CAR
Filed Jan. 19, 1944    4 Sheets-Sheet 4

INVENTOR:
ARTHUR L. LEE,
By Chas. M. Nissen,
ATT'Y

Patented Dec. 28, 1948

2,457,569

UNITED STATES PATENT OFFICE 2,457,569

SHUTTLE CAR

Arthur L. Lee, Upper Arlington, Ohio, assignor, by mesne assignments, to The Jeffrey Manufacturing Company, a corporation of Ohio Application January 19, 1944, Serial No. 518,810

22 Claims. (Cl. 214—83.36)

This invention relates to a shuttle car or other vehicle which in its specific form is adapted to carry coal in an underground coal mine.

An object of the invention is to provide an improved device of the above-mentioned type.

A further object of the invention is to provide an improved drive gearing for a shuttle car or other vehicle and more specifically such an improved drive mechanism in which a pair of wheels at one end of the vehicle are both driven and steerable and are driven by a motor and transversely extending interconnecting gearing adjacent said wheels.

A further object of the invention is to provide an improved relation of parts in a vehicle in which a pair of wheels, preferably steerable, is driven from a motor through a differential, which motor and differential are outside the main frame and, in the specific embodiment of the invention, outside of the bottom conveyor of the vehicle.

Another object of the invention is to provide a shuttle car having a conveyor in the bottom thereof and provided with two pairs of wheels both of which may be steering and traction wheels in which the pair of wheels adjacent each end of the vehicle is driven by a single motor, thus eliminating longitudinally extending drive shafts between the wheels at opposite ends and thereby increasing the possible capacity of the load carrying body of the vehicle and space for other equipment.

A further object of the invention is to provide a vehicle in which a pair of wheels is driven from a single motor through a differential, and duplicate housings are provided for at least part of each gear train leading to each wheel, the two housings being of similar construction and one of them housing a differential mechanism.

Other objects of the invention will appear hereinafter, the novel features and combinations being set forth in the appended claims.

In the accompanying drawings.

Figure 3:
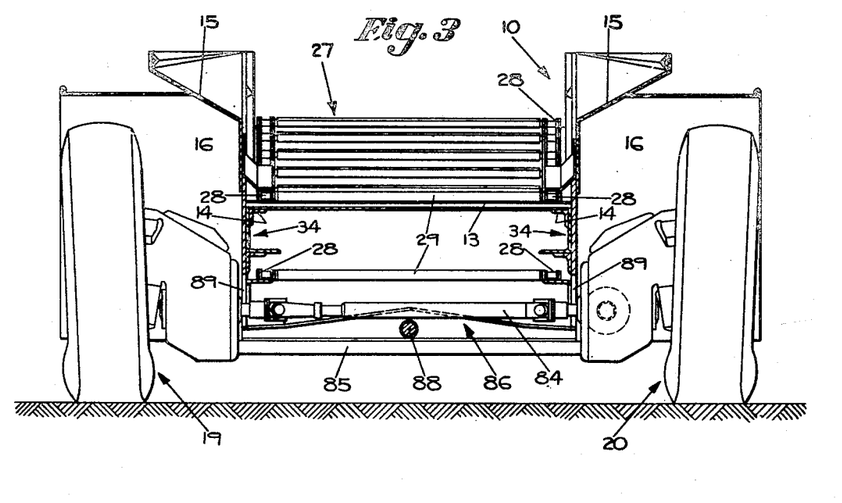
Figs. 3 and 4 are transverse sectional elevational views taken on the lines 3—3 and 4—4, respectively, of Fig. 1 looking in the direction of the arrows.
Figure 4:
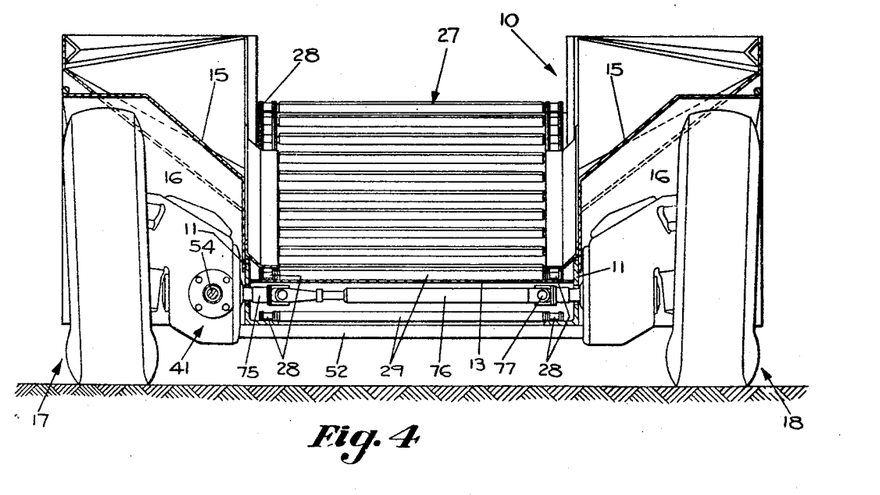
Figure 5:
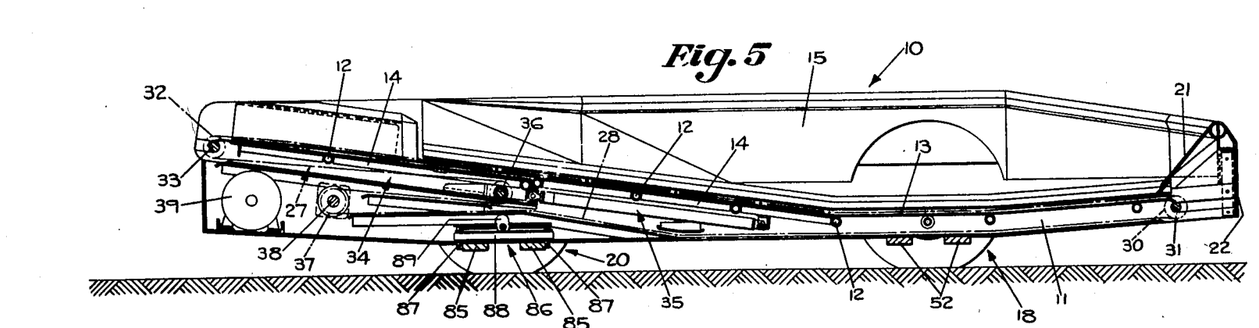
Fig. 5 is a longitudinal sectional elevational view taken on the line 5—5 of Fig. 2, looking in the direction of the arrows.

Referring particularly to Figs. 1, 2, 3, 4 and 5 of the drawings, there is illustrated a coal carrying buggy or shuttle car comprising a body 10 which includes a pair of longitudinally extending spaced apart angle main frame members 11, 11 which, as illustrated in Fig. 5 of the drawings, are interconnected at spaced intervals along their tops by transversely extending pipes 12 the ends of which preferably extend through holes in the angle members 11 and are welded thereto. Forming the working bottom of the body 10 is a longitudinally extending bottom plate 13 which is supported upon and rigidly attached to the pipes 12 and at its ends rests upon longitudinally extending angle members 14 which extend between the pipes 12 and are rigidly attached to the frame members 11, 11. If desired, additional intermediate angle members may be provided to support the bottom plate 13, the ends of which may be attached to the pipes 12.

By reference particularly to Fig. 5 of the drawings it will be noted that the right-hand or loading portion of the bottom plate 13 is generally horizontal and that it gradually slopes upwardly from its horizontal position starting at about the middle portion thereof. The purpose of this sloping bottom plate which ultimately leads to the discharge end of the shuttle car will be described hereinafter.

The construction of the body 10 is such as to provide a maximum of coal carrying capacity for any given height, width and length, as the function of the car is to carry coal between a loader by which it is loaded and a main or haulage conveyor or train of mine cars into which it discharges. Rigidly connected to the angle members 11, 11 and forming a part of the main frame, as well as of the body 10, are spaced longitudinally extending body plates 15, 15 which generally have their bottom portions in upright planes and which are then sloped outwardly to provide the lateral walls of the coal container formed by the body 10. These plates 15, 15 are actually fabricated from a number of plates which are welded together and this fabrication is such as to provide four spaced wheel assembly receiving wells 16 which receive four driving and steering wheel assemblies 17, 18, 19 and 20. The loading or right-hand end of the body 10 of the shuttle car is closed by a transversely extending upwardly sloping wall 21, and the connection between the two side plates 15 provided by this end wall 21 and between the angle members 14 is enhanced by a transversely extending connecting bumper plate 22, the wall or plate 21 and bumper plate 22 being rigidly connected to side plates 15 and the frame members 11. Adjacent its discharge end, the body 10 is preferably open, the slide plates 15 being here converging so that they are substantially vertical and spaced apart a distance substantially equal to the width of the bottom plate 13, thus providing a discharge throat through which the coal is discharged and also providing platform areas 23 and 24, the former of which preferably accommodates the operator's equipment including steering and control mechanism which is not illustrated and the latter preferably accommodating a cable reel mechanism 25 which supplies electric current to operate the vehicle in case it is not of the self-contained or battery operated type. Should the vehicle be of the battery operated type the batteries will be positioned between the wheels of the vehicle and outside of the side plates 15. The absence of longitudinal shafts between the wheels aids in securing adequate space for such batteries. In the structure illustrated, a controller box 26 occupies this space on one side of the vehicle and if it is of the battery operated type the controller box will be situated on the platform area 24 occupied by the cable reel mechanism 25 in the machine illustrated.

Figure 1:
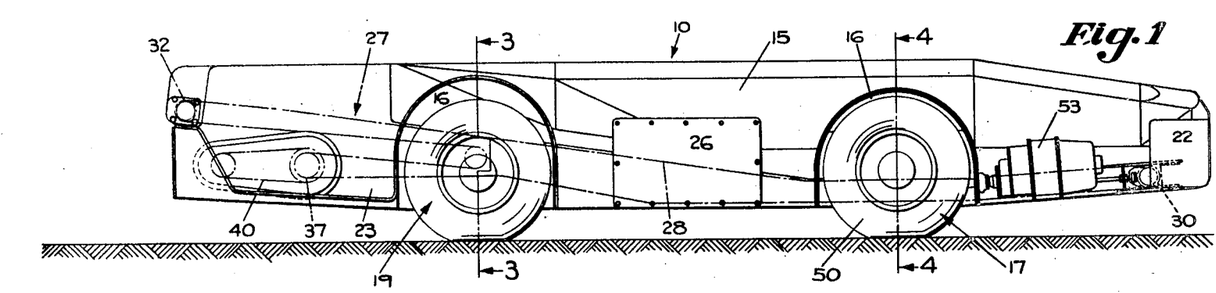
Fig. 1 is a side elevational view of a vehicle incorporating the features of my invention, certain steering and control mechanism not being shown in the interest of clearness.
Figure 2:
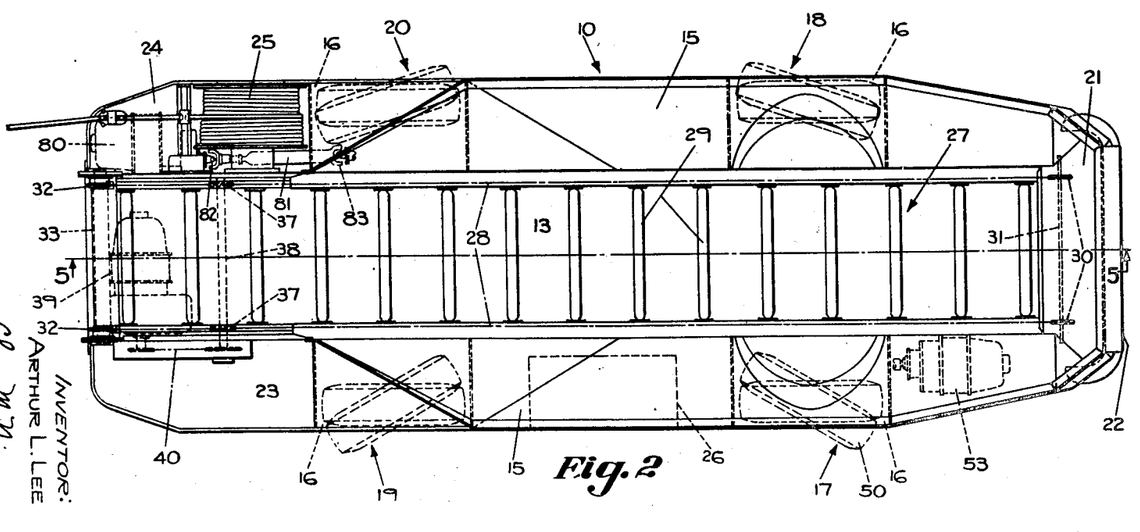
Fig. 2 is a plan view of the vehicle of Fig. 1.

Extending longitudinally through the body 10 and adapted to convey coal from the receiving end toward and out the discharge end or, in other words, from the right to the left, as viewed in Figs. 1, 2 and 5 of the drawings, is an endless conveyor mechanism 27. This conveyor mechanism 27 includes a pair of spaced endless conveyor chains 28, 28 which are interconnected by a plurality of transversely extending material conveying flights 29. The conveyor chains 28, 28 are reeved about spaced sprockets 30, 30 (see Fig. 2) mounted on an adjustable shaft 31 adjacent the receiving end of the shuttle car and extending over spaced sprockets 32, 32 mounted on a discharge end shaft 33, which shaft 33 is carried by a longitudinal extensible frame or boom 34 (see Fig. 5) which is disclosed in more detail and claimed in my application, Serial Number 528,887, filed March 31, 1944, for an improvement in a shuttle car. Insofar as it may be pertinent to the invention herein claimed, it need only be stated that the boom 34 is longitudinally adjustable by a double acting hydraulic piston motor 35 and in addition to the shaft 33 said boom 34 carries a shaft 36 (see Fig. 5) which, adjacent its end, carries a pair of sprockets over which the chains 28 extend and from which said chains extend to a pair of sprockets 37, 37, mounted on a transversely extending shaft 38 which is carried by the main frame or body 10. From the sprockets 37, 37 the chains 28 are guided and supported in their return travel to the aforedescribed sprockets 30.

That portion of the conveyor mechanism 27, including the chains 28 and flights 29 which extend between the sprockets 30, 30 and 32, 32 and above the bottom plate 13, of course constitutes the working run of the conveyor and is employed to convey the material and discharge it over the discharge shaft 33. The circuitous path of the return run of the conveyor mechanism 27 including the chains 28 is that described involving the shafts 36 and 38. It is evident that by mounting the shafts 33 and 36 on the adjustable frame or boom 34 adjustment of said discharge boom 34 may be effected without affecting the slack of the chains 28.

To drive the conveyor mechanism 27 I provide an electric motor 39 (see Figs. 2 and 5) which drives through a speed reducing mechanism and a chain and sprocket drive gearing 40 to drive the aforementioned shaft 38.

One of the features of my invention is the provision of means for driving the wheels of the vehicle in pairs from a single motor, the two wheels driven from any single motor being the pair adjacent one end of the vehicle. In other words, laterally spaced and aligned wheels are driven from a single motor. Furthermore, it is preferred that all four wheels be both power driven and steered, though it is to be understood that in certain broader aspects of my invention the steering may be limited to two of the wheels and power may be applied to the other two which may or may not be steered. In the interest of clearness, the mechanism for swinging the wheels about their steering axes is not illustrated since it may be of conventional design and per se forms no part of my invention. One of the features of this arrangement is the complete absence of drive shafts extending longitudinally of the vehicle between the pairs of wheels at opposite ends thereof which makes possible the more ready accommodation of batteries between the pair of front wheels and the pair of rear wheels. As hereinafter described in detail, this transverse drive between the pairs of laterally spaced and aligned wheels is effective while observing the principle of three-point suspension of the body or main frame 10.

There are other important features in this driving mechanism which shall be pointed out in a specific description thereof.

In order to effect uniformity of design and thus greater flexibility, interchangeability and greater economy through the provision of standard assemblies, it may be stated that in general the structure of each of the wheel assemblies 17, 18, 19 and 20 is the same, except for certain modifications in two of them which will be pointed out specifically hereinafter. Because of this fact, a description of wheel assembly 17, which is shown in detail in Fig. 7 of the drawings, will suffice except for the differences which exist between wheel assemblies 17 and 20 on the one hand and 18 and 19 on the other, which differences are illustrated in Fig. 8 of the drawings where a portion of wheel assembly 19 is illustrated.

In many of its structural details the wheel assembly 17 follows that of the wheel assembly disclosed and claimed in my application for a Mine Truck, Serial Number 515,679, filed Dec. 27, 1943, which has matured into Patent No. 2,395,333 on Feb. 19, 1946, and it is to be understood that unless a contrary condition is indicated, said wheel assembly 17 is in accordance with the disclosure of said application.

Briefly described, the wheel assembly 17 includes a stationary bracket or casting 41 which forms a casing or housing for a portion of a gear train, hereinafter described more completely. Pivotally mounted upon the bracket 41 about an upwardy extending inclined steering axis is a wheel bracket or casting 42. The pivotal steering axis about which the wheel bracket 42 is mounted on the stationary bracket 41 is along the axis of a connecting pivot pin 43 and the upper point of connection of the wheel bracket 42 with the stationary bracket 41 is by means of the pin 43 which is held in spaced apart portions adjacent the upper end of the bracket 41 into which an extension or cup 44 of the wheel bracket 42 extends, and which receives an anti-friction bearing 45 providing an anti-friction pivotal connection between said wheel bracket 42 and the stationary bracket 41. The lower pivotal connection between the wheel bracket 42 and the stationary bracket 41 is provided by a thrust bearing 46 and a circumferential bearing 47 which are positioned between cooperating parts of the wheel bracket 42 and a removable cap 48 which is removably attached by machine screws to the casting 41 and forms a part of the bracket 41. The detailed structure of these two pivotal connections between the wheel bracket 42 and the stationary bracket 41 is described in complete detail in my above mentioned application, Serial Number 515,679. The wheel bracket 42 carries a wheel 49 which is provided with a pneumatic tire 50.

Figure 6:
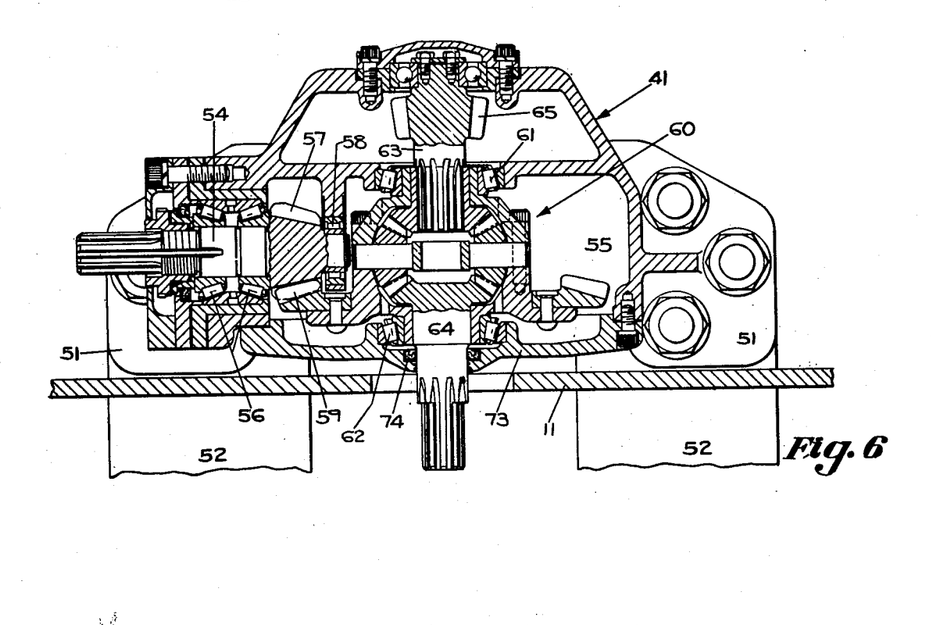
Fig. 6 is a transverse sectional plan view showing the differential mechanism for the driving wheels at the rear end of the vehicle.
Figures 7, 8:
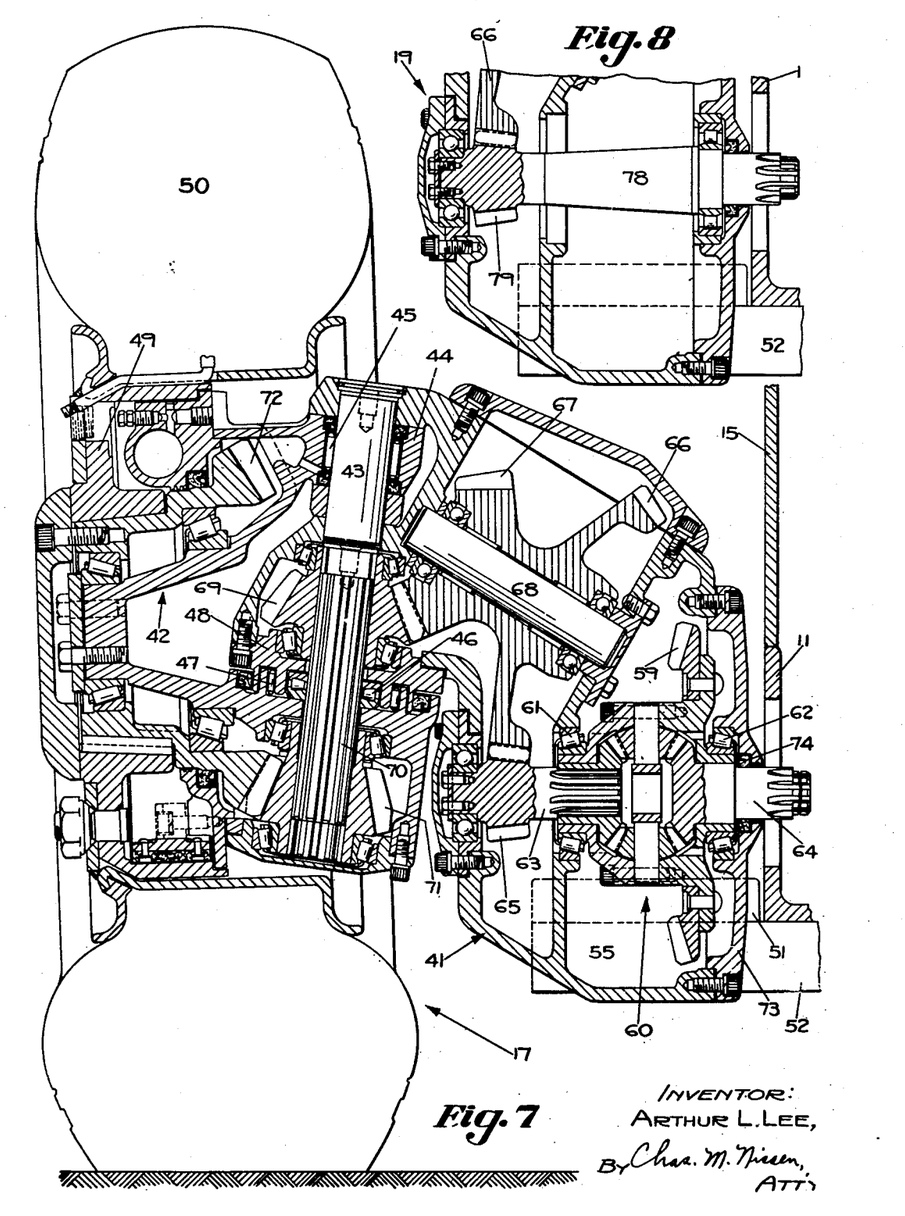
Fig. 7 is a sectional elevational view showing the wheel assembly and the drive gearing therefor of one of the wheel assemblies of the vehicle.
Fig. 8 is a sectional view of a portion of the wheel drive assembly of Fig. 7 shown modified to eliminate the universal joint which is the arrangement of the other wheel assembly paired with that disclosed in Fig. 7.

By reference particularly to Figs. 6 and 7 of the drawings, it will be seen that extending forwardly and rearwardly from the bracket 41 are integral feet 51, 51 which are attached by machine screws or bolts to a pair of laterally extending spaced apart main frame cross members or bars 52 preferably made of spring steel which are rigidly attached to the main frame members 11 to give a semi-spring mounting.

By reference to Fig. 4 of the drawings, it will be seen that the wheel assembly 18 is likewise attached to the opposite ends of the cross members 52 and consequently the two wheel assemblies 17 and 18 constitute a pair which, as hereinafter described more completely, are driven from a single driving motor. The relation of the wheel assemblies 17 and 18 to the body 10 and associated parts and the manner in which they are driven constitute important contributions of my invention.

It is to be noted, for example by reference to Fig. 4 of the drawings, that the stationary bracket 41 and the similar bracket of the wheel 18 are outside the main frame or adjacent a portion of the body 10, consequently they do not restrict the low clearance of the body 10 which may be extended downwardly between them. As a matter of fact, the conveyor mechanism 27 opposite the wheel assemblies 17 and 18 extends between the brackets. In a vertical plane taken through the brackets 41 the top of said conveyor mechanism 27 is appreciably below the tops of said brackets.

As previously mentioned, the wheel assemblies 17 and 18 preferably provide for steering thereof and in addition they are both preferably power driven. The arrangement which provides for the power drive for these two wheel assemblies 17 and 18 as a driving unit is an important feature of my invention and will now be described.

Referring particularly to Figs. 1 and 2 of the drawings, it will be seen there is an electric driving motor 53 adjacent the loading end of the vehicle which is positioned on a platform on the right side thereof, as viewed from the discharge end. The motor 53 drives a self-contained speed reducer, the output shaft of which drives a double universal jointed drive shaft which is coupled to a splined stub shaft 54 (see Fig. 6) which extends into a differential compartment 55 formed as an integral part of the casting or stationary bracket 41. The stub shaft 54 is mounted upon a pair of tapered roller bearings 56 adjacent its central portion and is provided with an integral pinion 57 beyond which there is an anti-friction roller bearing 58 which supports the inner end of the stub shaft 54. The pinion 57 meshes with and drives a ring gear 59 of a differential 60, the cage of which is supported in spaced tapered roller bearings 61 and 62. The structure of the differential 60 per se is of standard design and consequently needs no special description. Extending from it are two differentially driven shafts 63 and 64. Shaft 63 has an integral pinion 65 which meshes with a large gear 66 formed on a hub which carries another integral gear 67 at the opposite end thereof, said hub being journaled on anti-friction bearings on an inclined shaft 68 which is removably mounted in the stationary bracket 41 in a manner obvious by an inspection of Fig. 7 of the drawings.

It is obvious that the gear train so far described is one leading from the driving motor 53 to the wheel 49 and the other gears of this train include structure which is substantially like that described and claimed in my application, Serial Number 515,679. Briefly described, this includes a pinion 69 meshing with the gear 67 and driving a splined shaft 70, the axis of which is along the pivotal axis of the wheel 49 and which extends into both the stationary bracket 41 and the wheel bracket 42 and at its lower end drives a pinion 71 which meshes with a ring gear 72 rigidly attached to the wheel 49. The previously mentioned shaft 64 extends through the central opening of a removable cover plate 73 for the differential compartment 55, which cover plate 73 forms a part of the housing provided by bracket 41. This cover plate 73 also supports the previously described bearing 62 and is provided adjacent its opening with a grease seal 74 since the housing 41 is oil and grease tight and the lower portion thereof acts as a reservoir for lubricating oil to lubricate all of the parts contained within both the stationary housing 41 and the housing provided by the wheel bracket 42 and the associated wheel 49, as described more completely in my above mentioned application, Serial No. 515,679. In other words, the differential, all of the bearings, and all of the gears, of the wheel assembly 17 are lubricated from a common source which is the lubricating material contained in the bottom of housing 41.

The outer end of the shaft 64 is splined and extends in a floating relation into the sleeve of a universal joint 75 (see Fig. 4) which is mounted on one end of a transversely extending telescoping type drive shaft 76, the other end of which is provided with a similar universal joint 77 having a sleeve which has a floating relation with a stub shaft 78 (see Fig. 8) of the wheel assembly 19.

The wheel assembly 18 is not provided with a differential similar to the differential 60 since the wheel thereof is driven from the motor 53 through the shaft 64, shaft 76 and shaft 78 which has an integral pinion 79 which meshes with the gear 66 of the wheel assembly 18. Thus exact alignment between wheel assemblies 17 and 18 is not required, which allows for deflection of support cross-members 52 and errors of manufacturing and assembly.

There is another difference between the wheel assemblies 17 and 18. It is, of course, evident that the wheel assembly 18, in not having any differential mechanism 60 will also not have any drive shaft similar to the drive shaft 54 (see Fig. 6) and associated mechanism. Consequently in the wheel assembly 18 the drive shaft 54 and associated bearings as well as the cups, seals and adjusting nuts are removed and in their place a simple plate is provided which is screwed tight to the opening of the casting 41 through which the shaft 54 and above-mentioned associated parts extend in the wheel assembly 17.

From the above description, it is obvious that the wheels of the two assemblies 17 and 18 are power driven through differential mechanism 60 from a single motor 53. It is further to be noted, particularly by reference to Fig. 4 of the drawings, that the transverse shaft assembly including shaft 76 and universal joints 75 and 77 forms a continuous drive shaft that extends between the two wheel assemblies 17 and 18 and is positioned between the upper and lower runs of the conveyor mechanism 27. Furthermore, this transverse shaft is a telescoping collapsible type and at each outer end is provided with a splined sleeve which has a floating driving relation with the splined shaft 64 or 78. When the parts are assembled this drive shaft is extended and locked in extended position so as to insure the driving relation to the wheel assembly 18.

It is to be noted that either wheel assembly 17 or 18 is readily removable by the simple expedient of taking the load off of it, for example, as by inserting a jack under the cross members 52, and by removing the bolts or screws in the feet 51. The floating relation of the universal joints 75 and 77 and the splined shafts 64 and 78 is such as to require no disconnecting nuts or the like in this drive line. Wheel assemblies 17 and 18 may be readily assembled and if necessary during the assembling operation the drive shaft 76 may be contracted while the splines in the sleeve of one or more of the universal joints 75 and 77 are aligned with those of the associated shaft 64 or 78. It is thus to be seen that the shaft 76 and universal joints 75 and 77 float freely when in operating relation between the two wheel assemblies 17 and 18 but effect a positive drive between them.

It is also to be noted that by employing the spaced apart cross members 52 the intermediate bottom portion of housing 41 between the feet 51 extends downwardly between them. This allows the shaft 76 to be positioned between the upper and lower runs of the conveyor 27 as above mentioned, while providing a maximum of clearance for the bottom of the vehicle body above the mine floor. This makes for maximum depth and capacity of the body 10 for any given height since the shaft 56 is below a horizontal plane passing through the axis of rotation of wheels 49 of wheel assemblies 17 and 18.

The wheel assemblies 19 and 20 constitute an operatively connected pair of power driven steering wheels and the wheel assembly 20 is similar in construction to the wheel assembly 17 while wheel assembly 19 is similar in construction to wheel assembly 18. The manner in which wheel assemblies 19 and 20 are connected together and to the main frame or body 10 of the vehicle, is similar to that described in connection with wheel assemblies 17 and 18 except for certain differences which shall be pointed out.

The driving motor for the wheel assemblies 19 and 20 is preferably mounted below the previously mentioned platform area 24 and is seen at 66 (see Fig. 2). This motor is similar to the motor 53 and has an integrally formed speed reducing mechanism but since it is spaced longitudinally a greater distance from the wheel assembly 20 than the motor 53 is from wheel assembly 17, I provide a longer drive shaft 81 also having universal joints seen at 82 and 83 at opposite ends thereof, the latter of which has a splined sleeve which has a splined driving relation with the shaft 54 of wheel assembly 20.

It may be noted that the motors 53 and 80 are positioned on diagonal corners of the body 10 both longitudinally outside the wheel assemblies 17 and 18, and 19 and 20, respectively. In other words, these motors do not consume any of the desired space between wheel assemblies 18 and 20, or 17 and 19.

The similarity of the driving relation between wheel assemblies 19 and 20 on the one hand and 17 and 18 on the other hand are readily apparent from a comparison of Figs. 3 and 4 of the drawings. A transverse drive shaft 84, which like the drive shaft 76 is offset from the normal axis of rotation of the wheels, extends between the wheel assemblies 19 and 20 and is a duplicate in construction of the transverse drive shaft 76. Said shaft 84 is provided with universal joints at opposite ends thereof similar to universal joints 75 and 77.

The stationary supporting brackets of the wheel assemblies 19 and 20 are mounted on spaced cross members 85, 85 (see Figs. 3 and 5) which cross members 85, 85 form a portion of a pivoted axle 86 which axle is pivotally connected to transversely extending longitudinally spaced apart main frame plates 87, 87 by means of a longitudinally extending horizontal pivot pin 88. This construction, of course, provides for the three-point suspension of the body 10 from the four wheel assemblies 17, 18, 19 and 20. Since the axle 86 will pivot about the pin 88 there are elongated openings 89 in the side frame members or plates 15 through which the axles 64 and 78 of wheel assemblies 19 and 20 extend. It is also to be noted that adjacent the pivotal axle 86, both the upper and lower runs of the conveyor mechanism 27 are above the laterally extending drive shaft 84.

Except for the differences above pointed out, the relation of the wheel assemblies 19 and 20 to the pivotal axle 86 and the drive shaft 84 is essentially the same as the relation of the wheel assemblies 17 and 18 to the fixed axle 52 and drive shaft 76. As a consequence, the remarks previously made of the latter will generally apply to the former.

In the operation of the shuttle car, the vehicle will be drive by the two motors 53 and 85, the former driving the wheel assemblies 17 and 18, the latter driving the wheel assemblies 19 and 20 to a desired location in the mine, preferably adjacent the discharge boom of a loader. Coal gathered and discharged by the loader will be fed to fill the body 10 and during this operation the loading will preferably start nearest the discharge end and progress toward the loading end until the body 10 is filled to capacity. During this loading operation the conveyor mechanism 27 may or may not be operated but in any case the hydraulic piston motor 35 will be in its contracted position and the extensible conveyor frame 34 will be in the position illustrated in Figs. 1, 2 and 5 of the drawings.

During the maneuvering of the shuttle car it is obvious that power is available to drive all four wheels and in the preferred embodiment of my invention all four wheels are steerable. The wheels of each associated group are also driven through a differential. After the shuttle car is loaded the operator faces in the opposite direction and the shuttle car is driven to a point of discharge and the extensible conveyor frame 34 is extended rearwardly by the hydraulic piston motor 35 in a manner disclosed more completely and claimed in my co-pending application, Serial Number 528,887, above identified, and the coal is discharged by operating the conveyor mechanism 27 so that the coal is carried from the loading end to the discharge end. After the coal or other material is thus discharged, the extensible frame or boom 34 is retracted and the shuttle car repeats its operation.

It is thus obvious that an extremely flexible and easily serviceable shuttle car is provided. It is furthermore evident that if desired the driving may be confined to two of the wheels instead of all four of them and the steering may likewise be confined to two of the wheels instead of all four, though I prefer to drive and steer all four wheels. It is also to be noted that economy of manufacture and standardization is realized by virtue of the similarity of all four drive wheel assemblies including the supporting brackets 41, the only difference being that as to two of said wheel assemblies the universal joints 60 are eliminated and shaft 78 substituted, together with certain other associated and related parts. Except for these, however, the four wheel assemblies 17, 18, 19 and 20 include duplicate and interchangeable parts.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A vehicle including a main frame, a pair of laterally spaced steerable wheels for supporting one end of said frame, a second pair of laterally spaced wheels for supporting the other end of said main frame, means including a separate motor for driving each pair of said wheels positioned longitudinally outwardly thereof, and a differential between each motor and pair of wheels, said motors and differentials all being located laterally of said main frame.

2. A vehicle including a main frame, a pair of laterally spaced wheels for supporting one end of said frame, a second pair of laterally spaced wheels for supporting the other end of said main frame, means including a separate motor for driving each pair of said wheels positioned longitudinally outwardly thereof, and a differential between each motor and pair of wheels, said motors and differentials all being located laterally of said main frame.

3. A vehicle including a main frame, a pair of laterally spaced wheels for supporting one end of said frame, a second pair of laterally spaced wheels for supporting the other end of said main frame, means including a separate motor for driving each pair of said wheels positioned longitudinally outwardly thereof, said motors being located laterally of said main frame.

4. A vehicle including a main frame, a pair of laterally spaced steerable wheels for supporting one end of said frame, a second pair of laterally spaced wheels for supporting the other end of said main frame, means including a separate motor for driving each pair of said wheels positioned longitudinally outwardly thereof, and a differential between each motor and pair of wheels, said differentials being located laterally of said main frame.

5. A vehicle including a main frame, a pair of laterally spaced wheels for supporting one end of said frame, a second pair of laterally spaced wheels for supporting the other end of said frame, means including a separate motor for driving each pair of said wheels, and a differential between each motor and pair of wheels, said differentials being located laterally of said main frame and axially inwardly of the adjacent wheels.

6. A vehicle including a pair of steerable wheels, a motor for driving said wheels, gearing interconnecting said wheels including a differential whereby said wheels may have differential movement while being driven, and substantially duplicate housings for at least part of the drive gearing to each wheel, each of said housings including brackets mounted for pivotal steering adjustment, one of said duplicate housings receiving said differential.

7. A compact vehicle wheel assembly including a supporting housing bracket adapted to be mounted to and at one side of the frame of a vehicle, a steerable wheel, means mounting said wheel on said bracket for steering adjustment, gearing for driving said wheel and for permitting steering movement thereof including a differential, said differential being contained within said supporting housing bracket closely adjacent said mounting means.

8. A compact vehicle wheel assembly including a supporting housing bracket adapted to be mounted to and at one side of the frame of a vehicle, a wheel, means mounting said wheel on said bracket, gearing for driving said wheel including a differential, said differential being contained within said supporting housing bracket closely adjacent said wheel.

9. A vehicle including a main frame, a pair of steering and driving wheel assemblies at one end of said main frame spaced one on each side thereof, each of said assemblies including a wheel supporting gear enclosing bracket, means connecting said brackets in spaced relation as aforesaid, drive gearing for said wheels enclosed at least in part in said brackets, means including a drive shaft extending outside said brackets and located between them and connecting the drive gearing of said wheel assemblies to rotate together, at least one of said wheel assemblies being removable from said connecting means and freely slidable from said drive shaft.

10. A vehicle including a main frame, a pair of driving wheel assemblies at one end of said main frame spaced one on each side thereof, each of said assemblies including a wheel supporting gear enclosing bracket, means connecting said brackets in spaced relation as aforesaid, drive gearing for said wheels enclosed at least in part in said brackets, means including a drive shaft extending outside said brackets and located between them and connecting the drive gearing of said wheel assemblies to rotate together, at least one of said wheel assemblies being removable from said connecting means and freely slidable from said drive shaft.

11. A compact power driven steerable wheel assembly including a supporting bracket and housing adapted to be mounted to and at one side of the frame of a vehicle, a wheel bracket, means pivotally mounting said wheel bracket on said supporting bracket, a wheel on said wheel bracket, and gearing for driving said wheel including a differential contained in said supporting bracket and housing closely adjacent said pivotal mounting means.

12. A compact power driven wheel assembly including a supporting bracket and housing adapted to be mounted to and at one side of the frame of a vehicle, a wheel bracket, means mounting said wheel bracket on said supporting bracket, a wheel on said wheel bracket, and gearing for driving said wheel including a differential contained in said supporting bracket and housing closely adjacent said mounting means.

13. In combination, a pair of spaced driven wheel assemblies each including a wheel and drive gearing therefor, an axle pivoted on a horizontal axis transverse to the axle, said assemblies being mounted on opposite ends of said axle, and means for driving both wheel assemblies from a common source of power including a shaft extending between said pair of wheel assemblies.

14. In combination, a pair of spaced driven wheel assemblies each including a wheel and drive gearing therefor, an axle, said assemblies being mounted on opposite ends of said axle, and means for driving both wheel assemblies from a common source of power including a shaft extending between said pair of wheel assemblies.

15. In a vehicle, a frame, a pair of wheel assemblies at opposite sides of said frame for supporting it, and means including spaced apart cross members connecting said wheel assemblies, said wheel assemblies having frame portions extending downwardly between said spaced cross members.

16. In a vehicle, a frame, a pair of wheel assemblies at opposite sides of said frame for supporting it, means including spaced apart cross members connecting said wheel assemblies, means pivotally mounting said cross-members on a horizontal axis, said wheel assemblies having frame portions extending downwardly between said spaced cross members.

17. In a vehicle, a frame, a pair of driven wheel assemblies on opposite sides of said frame, spaced cross members interconnecting said wheel assemblies, said wheel assemblies including gear housings having portions between said spaced apart members, means for pivoting said wheel assemblies and cross members on a horizontal axis, and gearing connecting said wheel assemblies for driving including a shaft extending between them.

18. In a vehicle, a frame, a pair of driven wheel assemblies on opposite sides of said frame, spaced cross members interconnecting said wheel assemblies, said wheel assemblies including gear housings having portions between said spaced apart members, and gearing connecting said wheel assemblies for driving including a shaft extending between them.

19. A vehicle including a main frame, a material conveying body on said main frame, a longitudinally extending endless conveyor in the bottom of said body, a pair of power driven steerable wheel assemblies at one end of said frame, one on each side thereof, each including a traction wheel, a driving motor for driving both of said wheels, and a drive shaft extending transversely of said frame and interconnecting drive gearing to both of said wheels, said drive gearing including a differential in one of said assemblies located outside said main frame, each of said steerable wheel assemblies also including a frame bracket attached to said main frame and a pivotally attached wheel bracket mounted on said frame bracket for steering movement about a steering axis, the axis of said transversely extending drive shaft being located below a horizontal plane passing through the axes of rotation of said steerable wheels, and extending between the upper and lower runs of said endless conveyor.

20. A vehicle including a main frame, a pair of power driven steerable wheel assemblies at one end of said frame, one on each side thereof, each including a traction wheel, a driving motor for driving both of said wheels, and a drive shaft extending transversely of said frame and interconnecting drive gearing to both of said wheels, said drive gearing including a differential in one of said assemblies located outside said main frame, each of said steerable wheel assemblies also including a frame bracket attached to said main frame and a pivotally attached wheel bracket mounted on said frame bracket for steering movement about a steering axis, the axis of said transversely extending drive shaft being located below a horizontal plane passing through the axes of rotation of said steerable wheels.

21. A vehicle including a main frame, a material conveying body on said main frame, a longitudinally extending endless conveyor in the bottom of said body, a pair of power driven wheel assemblies at one end of said frame, one on each side thereof, each including a traction wheel, a driving motor for driving both of said wheels, and a drive shaft extending transversely of said frame and interconnecting drive gearing to both of said wheels, said drive gearing including a differential in one of said assemblies located outside said main frame, the axis of said transversely extending drive shaft being located below a horizontal plane passing through the axes of rotation of said wheels, and extending between the upper and lower runs of said endless conveyor.

22. A vehicle including a main frame, a pair of power driven wheel assemblies at one end of said frame, one on each side thereof, each including a traction wheel, a driving motor for driving both of said wheels, a drive shaft extending transversely of said frame and interconnecting drive gearing to both of said wheels, said drive gearing including a differential in one of said assemblies located outside said main frame, the axis of said transversely extending drive shaft being located below a horizontal plane passing through the axes of rotation of said wheels.

ARTHUR L. LEE.

REFERENCES CITED

The following references are of record in the file of this patent:

UNITED STATES PATENTS

| Number | Name | Date |
| --- | --- | --- |
| 424,207 | Hunter | Mar. 25, 1890 |
| 760,628 | Howe | May 24, 1904 |
| 773,575 | Krotz | Nov. 1, 1904 |
| 1,097,261 | Platt | May 19, 1914 |
| 1,283,880 | O'Toole | Nov. 5, 1918 |
| 1,512,562 | Radies | Oct. 21, 1924 |
| 1,618,431 | Herrington | Feb. 22, 1927 |

(Other references on following page)

UNITED STATES PATENTS

| Number | Name | Date |
|---|---|---|
| 1,665,865 | Templin | Apr. 10, 1928 |
| 1,852,226 | Asam | Apr. 5, 1932 |
| 1,950,567 | Race | Mar. 13, 1934 |
| 2,192,650 | Russell | Mar. 5, 1940 |
| 2,274,314 | Whaley | Feb. 24, 1942 |
| 2,316,521 | Lee | Apr. 13, 1943 |
| 2,317,623 | Lee | Apr. 27, 1943 |
| 2,325,730 | Arentzen et al. | Aug. 3, 1943 |
| 2,336,386 | Beck | Dec. 7, 1943 |
| 2,357,742 | Jeffrey | Sept. 5, 1944 |
| 2,359,889 | Bigelow | Oct. 10, 1944 |
| 2,360,282 | Russell | Oct. 10, 1944 |

FOREIGN PATENTS

| Number | Country | Date |
|---|---|---|
| 209,926 | Great Britain | Oct. 20, 1923 |
| 353,092 | France | June 20, 1905 |
| 632,968 | Germany | July 16, 1936 |